March 2, 1971

W. C. ALBERT 3,567,231

ROTARY SEAL ASSEMBLY

Filed Dec. 4, 1968

INVENTOR
WILLIAM C. ALBERT

BY

*S. A. Giarratana*

ATTORNEY

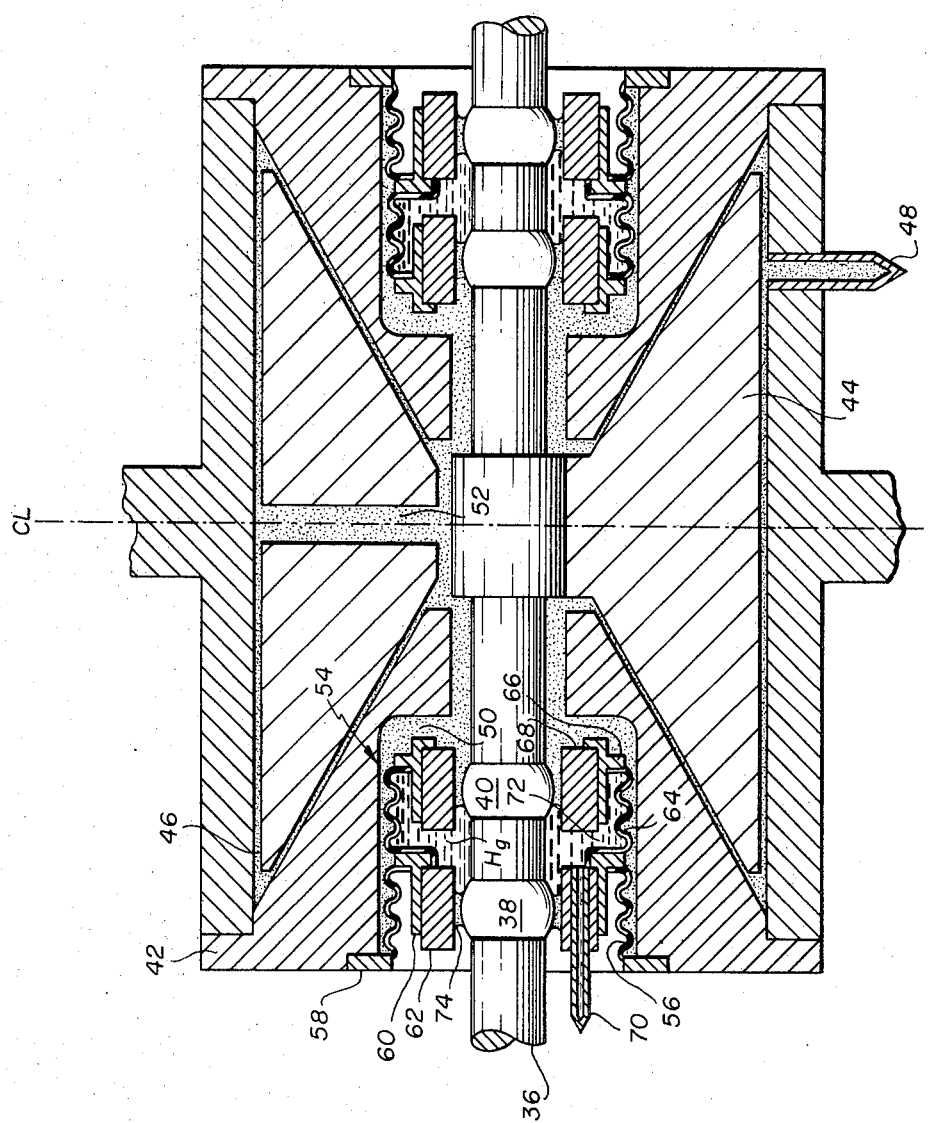

United States Patent Office 3,567,231
Patented Mar. 2, 1971

3,567,231
ROTARY SEAL ASSEMBLY
William C. Albert, Waldwick, N.J., assignor to Singer-General Precision, Inc., Little Falls, N.J.
Filed Dec. 4, 1968, Ser. No. 781,166
Int. Cl. F16j *15/40*
U.S. Cl. 277—135                     2 Claims

ABSTRACT OF THE DISCLOSURE

A sealing assembly for a rotating member extending in two mediums of differing pressures, including one or more bushings extending over the rotating member with a non-wetting liquid disposed in a space between the bushings and the rotating member to provide a seal between the mediums.

BACKGROUND OF THE INVENTION

This invention relates to a rotary seal assembly, and, more particularly, to such an assembly for permitting a rotary member to operate in two or more mediums of different pressure.

Various standard type bearing means such as ball bearings, etc., are generally used to provide a bearing for a high speed rotary member. However, in environments involving two mediums, such as a first medium at a relatively high pressure in which the drive motor, etc., for the rotary shaft is located, and a second medium of a relatively low pressure in which high precision equipment is contained, such as gyroscopic components, etc., the ball bearings and the like are undesirable due to the fact that their lubricant would be forced into the low pressure medium, and would therefore impair the operation of the high precision equipment.

SUMMARY OF THE INVENTION

It is therefore an object of the present invention to provide a sealing assembly which is separate from the bearing assembly and which enables portions of the rotary member to be disposed in separate mediums.

Briefly summarized, the rotary seal assembly of the present invention includes a housing extending over the rotating member and in both of said mediums, at least one bushing movably mounted to said housing with its inner wall spaced from an outer wall portion of said shaft, and a non-wetting liquid extending in the space between said bushing and said shaft to provide a seal between said mediums.

BRIEF DESCRIPTION OF THE DRAWINGS

Reference is now made to the accompanying drawings for a better understanding of the nature and objects of the rotary seal assembly of the present invention, which drawings illustrate the best mode presently contemplated for carrying out the objects of the invention and its principles, and are not to be construed as restrictions or limitations on its scope. In the drawings:

FIG. 2 is a view similar to FIG. 1 but depicting the rotary seal assembly of the present invention in a different environment.

DESCRIPTION OF THE PREFERRED EMBODIMENTS

Figure 1:
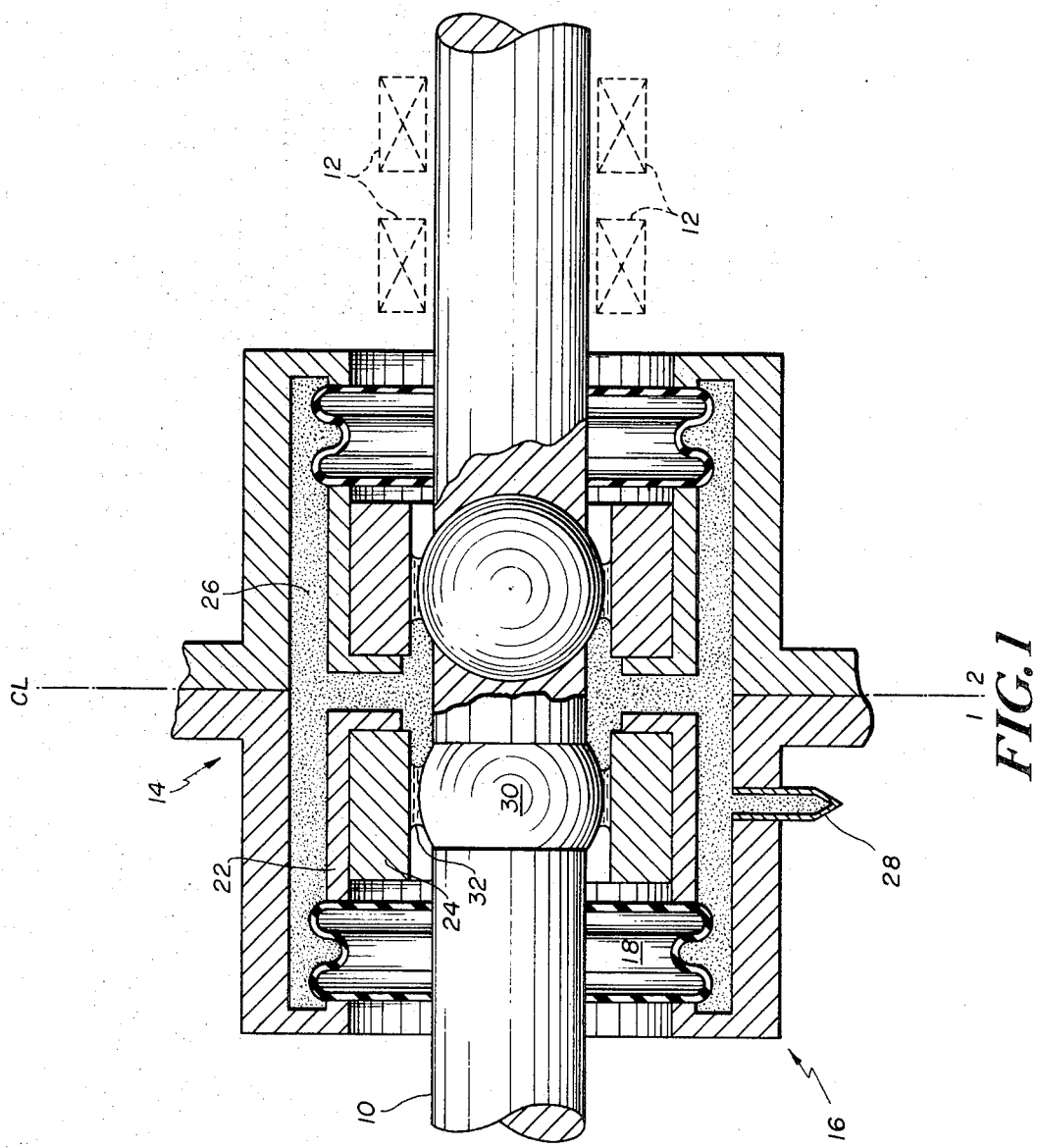
FIG. 1 is a vertical sectional view, partially diagrammatic, depicting the rotary seal assembly of the present invention.

Referring specifically to FIG. 1 of the drawings, the seal assembly of the present invention is shown in engagement with a rotating shaft 10 which extends from a medium 1 of low pressure, which may be a vacuum, for example, to a medium 2 of high pressure, so that high precision components, such as those of a gyroscope can be operated in the first medium. The drive motor end of the shaft 10 is supported in a pair of bearings 12 in a known manner in the second medium, and the seal assembly 14 extends between the bearings and the other end of the shaft. Since the seal assembly 14 comprises two identical portions, only the left hand portion will be shown for convenience of presentation. Specifically, the assembly 14 comprises a housing 16 having a center line CL generally coinciding with the dividing line between the two mediums. One end of a bellows 18 is fixed to a flange formed at the end of the housing 16, the bellows being adapted to expand axially with respect to the shaft 10. The other end of the bellows 18 is connected to a flanged bushing housing 22 which encloses a cylindrical bushing 24. The bushings 24 of each portion of the assembly are spaced from each other and from the inner wall of the housing 16 to define a chamber 26 which is charged with a non-wetting liquid, such as a liquid metal, through a fill tube 28 under a pressure which is higher than that of each of the two mediums. The inner wall of the bushing 24 is spaced a small distance from a spherical portion 30 of the shaft 10, as shown.

It can be appreciated from the above that the liquid metal disposed in chamber 26 acts as a seal to prevent any fluid from the medium 2 passing through the center line CL of the housing 14 into the medium 1, or vice versa, which seal is relatively strong due to the small clearance made possible by the spherical portions 30 formed on the shaft 10. Also the liquid metal, being a non-wetting liquid, does not wet or react with the seal walls or mediums that it comes into contact with, and, due to the relatively high surface tension of the liquid metal and to the design of the contact angle that it makes the wall of the spherical portion 30 of the shaft 10, the liquid metal does not escape through the clearance between the bushing and the spherical portion of the shaft.

An additional oil film 32 may be introduced into the space between the bushing and the spherical portion 30, and is held in place by its adhesive forces to prevent dry contact between the bushing and the spherical portion. In an application where the oil is exposed to a vacuum, a very low vapor pressure vacuum pump can be used.

The use of the bellows 18 to mount the bushing 24 to the housing 16 permits the bushing to move relative to the housing so that the bushing can center itself on the spherical portion 30 of the shaft without any critical alignments. Also, since a hydrodynamic bearing is formed by the liquid metal in the small gap between the spherical portion of the shaft and the bushing, the variation in the pressure distribution about the bearing portion of the seal in response to an eccentricity occurring between the bushing and the spherical portion, develops a very high net force which tends to keep the bushing centered on the ball, in accordance with classical hydrodynamic theory.

Of course, any changes in the volume of the liquid metal in chamber 26 due to temperature variations will be compensated for by corresponding expansion and contraction of the bellows.

According to a further feature of the present invention, the bushing and bellows assembly is so designed that the buoyant forces of the liquid metal on the assembly are exactly equal to the weight of the assembly, and, of course, opposite in direction. Therefore the assembly floats in the liquid metal in a condition of neutral buoyancy, and the load on the spherical portion 30 of the shaft due to the bushing weight is nominally zero.

The embodiment of FIG. 2 depicts the rotary seal assembly of the present invention in use with a hydrodynamic conical type bearing disposed in a medium 1 of a relatively low pressure, and a medium 2 of a relatively high pressure. Again reference is made only to the left portion of the drawing, it being understood that identical components of the conical bearing, as well as the seal assembly, are formed on both sides of the center line CL. As shown, a shaft 36 is rotated by any known means disposed in the medium 2, and has a pair of spherical portions 38 and 40 formed at each end. A housing 42 is provided for the shaft and its center line CL generally coincides with the dividing line between the two mediums. A frusto-conical shaped flange 44 is formed on the shaft 36 near the central portion thereof and is enclosed by the housing 42. The outer surfaces of the flange 44 are spaced from the corresponding inner surfaces of the housing 42 to provide a flow channel 46 for a bearing lubricant for the rotating shaft and flange, which lubricant may be in the form of silicone oil, helium gas, etc. The lubricant is passed into the channel through a fill tube 48, and flows through the channel, through a space between the shaft and the housing, into a chamber 50 formed in the housing, and into a return pasage 52 formed in the flange portion 44.

The seal assembly 54 is disposed in the chamber 50 and comprises a bellows 56 having one end attached to a ring 58 formed at the end of the housing 42, and the other end attached to a bushing housing 60 which partially encloses a bushing 62, the latter being spaced a small distance from the spherical portion 38 of the shaft 36. An additional bellows 64 has one end fixed to the end of the bushing housing 60 and the other end fixed to an additional bushing housing 66 which encloses a bushing 68, the latter being spaced a small distance from the spherical portion 40 of the shaft 36.

A non-wetting liquid, such as liquid metal, is passed from a fill tube 70 under a pressure higher than that of the medium 1 and the bearing lubricant into a chamber 72 extending between the bellows 64 and the shaft 36, and between the bushing assemblies, so that the liquid metal acts as a seal between the low pressure medium 1 and the bearing lubricant.

As in the previous embodiment, the surface tension of the liquid metal and the design of the contact angle it makes with the walls of the spherical portions 38 and 40 prevents the liquid metal from escaping through the clearances between the spherical portions and their corresponding bushings. Also, an additional oil film 74 may be introduced into the space between the inner wall of the bushing 62 and the outer wall of the spherical portion 38 of the shaft 36 to prevent dry contact between the bushing and the spherical portion.

As emphasized above, structure identical to that just described is disposed on the right of the center line CL, and the liquid metal at that end is passed into its chamber at a pressure higher than that of the bearing lubricant and the high pressure medium 2, to seal the latter from the former.

Upon the liquid metal expanding or contracting due to temperature changes, the bushings 58 and 64, and, of course, their respective housings will move axially in opposite directions, while, upon the bearing lubricant expanding or contracting, the bushings and their corresponding housings will move axially in the same direction.

It is thus apparent from the above that the advantages set forth in the embodiment of FIG. 1 are equally applicable to the arrangement of FIG. 2.

Of course, other variations of the specific construction and arrangement of the rotary seal assemblies disclosed above can be made by those skilled in the art without departing from the invention as defined in the appended claims.

What is claimed is:

1. A seal assembly for a rotating member extending in at least two mediums of differing pressures, comprising a housing extending over said rotating member and in each of said mediums, at least one bushing movably mounted to said housing with its inner wall spaced from an outer wall portion of said rotating member, and a non-wetting liquid extending in the space between said bushing and said rotating member to provide a seal between the two adjacent mediums, wherein said outer wall portion of said rotating member is spherical in shape and said liquid extends in said space by means of its surface tension.

2. The assembly of claim 1 wherein said liquid is in the form of a liquid metal.

References Cited

UNITED STATES PATENTS

| | | | |
|---|---|---|---|
| 2,291,248 | 7/1942 | Myers | 277—135 |
| 2,462,901 | 3/1949 | Robison | 277—135 |
| 2,547,428 | 4/1951 | Ziherl | 277—135 |
| 3,017,191 | 1/1962 | Patterson | 277—135 |

DOUGLAS HART, Primary Examiner

U.S. Cl. X.R.

277—59